United States Patent
Leonardi et al.

(10) Patent No.: US 11,592,794 B2
(45) Date of Patent: Feb. 28, 2023

(54) MOBILE APPLICATION FOR SMART SYSTEMS INTERACTION

(71) Applicant: Carrier Corporation, Palm Beach Gardens, FL (US)

(72) Inventors: Francesco Leonardi, Palm Beach Gardens, FL (US); Wilmann Gomez, Palm Beach Gardens, FL (US); Muthuswamy Hariharamuthu, Palm Beach Gardens, FL (US); Nagavendra Chappa, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 193 days.

(21) Appl. No.: 16/876,410

(22) Filed: May 18, 2020

(65) Prior Publication Data

US 2020/0401091 A1 Dec. 24, 2020

Related U.S. Application Data

(60) Provisional application No. 62/862,901, filed on Jun. 18, 2019.

(51) Int. Cl.
| | |
|---|---|
| G05B 15/02 | (2006.01) |
| H04L 67/125 | (2022.01) |
| G06F 21/32 | (2013.01) |
| H05B 47/10 | (2020.01) |
| B66B 1/14 | (2006.01) |
| F24F 11/52 | (2018.01) |
| G06F 3/0482 | (2013.01) |

(52) U.S. Cl.
CPC ............. *G05B 15/02* (2013.01); *B66B 1/14* (2013.01); *F24F 11/52* (2018.01); *G06F 3/0482* (2013.01); *G06F 21/32* (2013.01); *H04L 67/125* (2013.01); *H05B 47/10* (2020.01)

(58) Field of Classification Search
CPC ... B66B 1/14; B66B 1/468; B66B 2201/4615; B66B 2201/4653; B66B 3/006; F24F 11/52; G05B 15/02; G06F 21/32; G06F 21/6218; G06F 3/0482; G06F 3/0488; H04L 63/0861; H04L 67/125; H04W 12/08; H05B 47/00; H05B 47/10
See application file for complete search history.

(56) References Cited

U.S. PATENT DOCUMENTS

2016/0327921 A1* 11/2016 Ribbich ................ F24F 11/70
2017/0059466 A1 3/2017 Park
(Continued)

FOREIGN PATENT DOCUMENTS

| CN | 101378982 A | 3/2009 |
| CN | 107146471 A | 9/2017 |

(Continued)

*Primary Examiner* — Yuhui R Pan
(74) *Attorney, Agent, or Firm* — Carlson, Gaskey & Olds, P.C.

(57) ABSTRACT

A building control system includes a plurality of interconnected building systems. A mobile application is configured to be installed on at least one mobile device. The mobile application is configured to cause the mobile device to interface with the building server and to display a graphical user interface (GUI). The GUI includes an elevator pane configured to allow a user to interface with a building elevator control system.

16 Claims, 9 Drawing Sheets

(56) References Cited

U.S. PATENT DOCUMENTS

| | | | | |
|---|---|---|---|---|
| 2017/0122744 | A1* | 5/2017 | Long | G01C 21/206 |
| 2018/0121072 | A1* | 5/2018 | Baldi | G06F 3/0482 |
| 2018/0282114 | A1* | 10/2018 | Baldi | B66B 1/468 |

FOREIGN PATENT DOCUMENTS

| | | |
|---|---|---|
| CN | 107736045 A | 2/2018 |
| CN | 108693792 A | 10/2018 |
| CN | 109071156 A | 12/2018 |
| CN | 109416550 A | 3/2019 |
| CN | 109573752 A | 4/2019 |

\* cited by examiner

MOBILE APPLICATION FOR SMART SYSTEMS INTERACTION

CROSS-REFERENCE TO RELATED APPLICATION

This application claims priority to U.S. Provisional Application No. 62/862,901 filed on Jun. 18, 2019.

TECHNICAL FIELD

The present disclosure relates generally to control applications for building systems, and more specifically to a unified graphical user interface for a mobile application that interacts with multiple building systems.

BACKGROUND

Current buildings include many smart building systems including heating, ventilation and cooling (HVAC) systems, lighting systems, automated door locks, and the like. Each of the smart building systems can include their own proprietary interfaces and operations, and can include their own corresponding control applications. In some examples, the building systems can be interacted with using standard mobile devices and systems, and in other cases the building systems include dedicated apps, or complicated control devices, in order to implement the controls.

Occupants and regular visitors to buildings including multiple distinct building systems are faced with multiple scattered ways to interact with the building systems, each of which can have its own subsystems, interfaces, and features. Further complicating the interfacing is the fact that smart building systems typically carry with them increased levels and amounts of control over the corresponding system. The increased amount of control, and the varied means by which that control is achieved, can make it difficult for a regular user to fully understand and manipulate the corresponding controls. This difficulty is exacerbated for infrequent users and/or guests who may not be familiar with a given control scheme.

SUMMARY OF THE INVENTION

In one exemplary embodiment a building control system includes a plurality of interconnected building systems, a mobile application configured to be installed on at least one mobile device, and configured to cause the at least one mobile device to interface with the building server and to display a graphical user interface (GUI), wherein the GUI includes an elevator pane configured to allow a user to interface with a building elevator control system.

In another example of the above described building control system the building systems include a heating ventilation and cooling (HVAC) system, a lighting system, and an access/reservation system.

In another example of any of the above described building control systems each of the building systems is interconnected via at least one building server.

In another example of any of the above described building control systems the GUI includes a location pane configured to display a location of the mobile device within a building, a comfort pane configured to display an increase option and a decrease option, a lighting pane configured to display a lighting option of the location of the mobile device and to display a lighting control option, and an access pane configured to display access information of at least one entryway of the building.

In another example of any of the above described building control systems at least one of the building server and the mobile application include a memory storing at least one preferred elevator, and wherein the mobile application defaults to selecting the preferred elevator in response to multiple entryways being on the same floor as the mobile device.

In another example of any of the above described building control systems the mobile application further includes a user credentialing system configured to interface with the building server, and determine an access level credential of a user of the mobile device.

In another example of any of the above described building control systems the GUI includes a login screen, and wherein the user is required to gain access level credentials from the building server through the mobile device prior to the GUI displaying the elevator pane.

In another example of any of the above described building control systems the user is required to provide biometric verification to gain access level credentials.

In another example of any of the above described building control systems the elevator pane includes at least one desired floor button, with each desired floor button corresponding to a destination floor.

In another example of any of the above described building control systems the elevator pane further includes a drop down menu configured to display a complete list of floors to which the user has access.

In another example of any of the above described building control systems each floor that the user is not authorized to access is omitted from the complete list of floors.

In another example of any of the above described building control systems each floor that the user is not authorized to access is included in the complete list of floors and is visually distinct from a remainder of floors.

In one exemplary embodiment a mobile application for controlling smart building systems includes a graphical user interface including; a location pane configured to display a location of the mobile device within a building, an elevator pane configured to display a recommended elevator based on a user's location within the building and the user's desired floor, and an access pane configured to display access information of at least one entryway of the building.

In another example of the above described mobile application for controlling smart building systems the elevator pane includes a display indicating a current floor of the user and a plurality of buttons indicating possible destination floors.

In another example of any of the above described mobile applications for controlling smart building systems the plurality of buttons is a set of preferred floors based at least in part on one of a user entered listing of preferred floors and the user's past locations within the building.

In another example of any of the above described mobile applications for controlling smart building systems the location of the mobile device within the building is a contextually determined location and the location is determined via at least one of data from the mobile device, data from a building server.

Another example of any of the above described mobile applications for controlling smart building systems further includes a single search option configured to receive one of a conference room name, a point of interest name, a point of interest type, floor number and a user name and cause the mobile application to perform a corresponding search.

In another example of any of the above described mobile applications for controlling smart building systems the graphical user interface is configured to display a recommended elevator bank in response to receiving a floor number.

In another example of any of the above described mobile applications for controlling smart building systems the graphical user interface is configured to display a map directing the user to the recommended elevator bank.

In another example of any of the above described mobile applications for controlling smart building systems the graphical user interface is configured to prompt the user to confirm a switch from the recommended elevator bank to a different elevator bank in response to the user moving toward the different elevator bank.

These and other features of the present invention can be best understood from the following specification and drawings, the following of which is a brief description.

DETAILED DESCRIPTION OF AN EMBODIMENT

Figure 1:
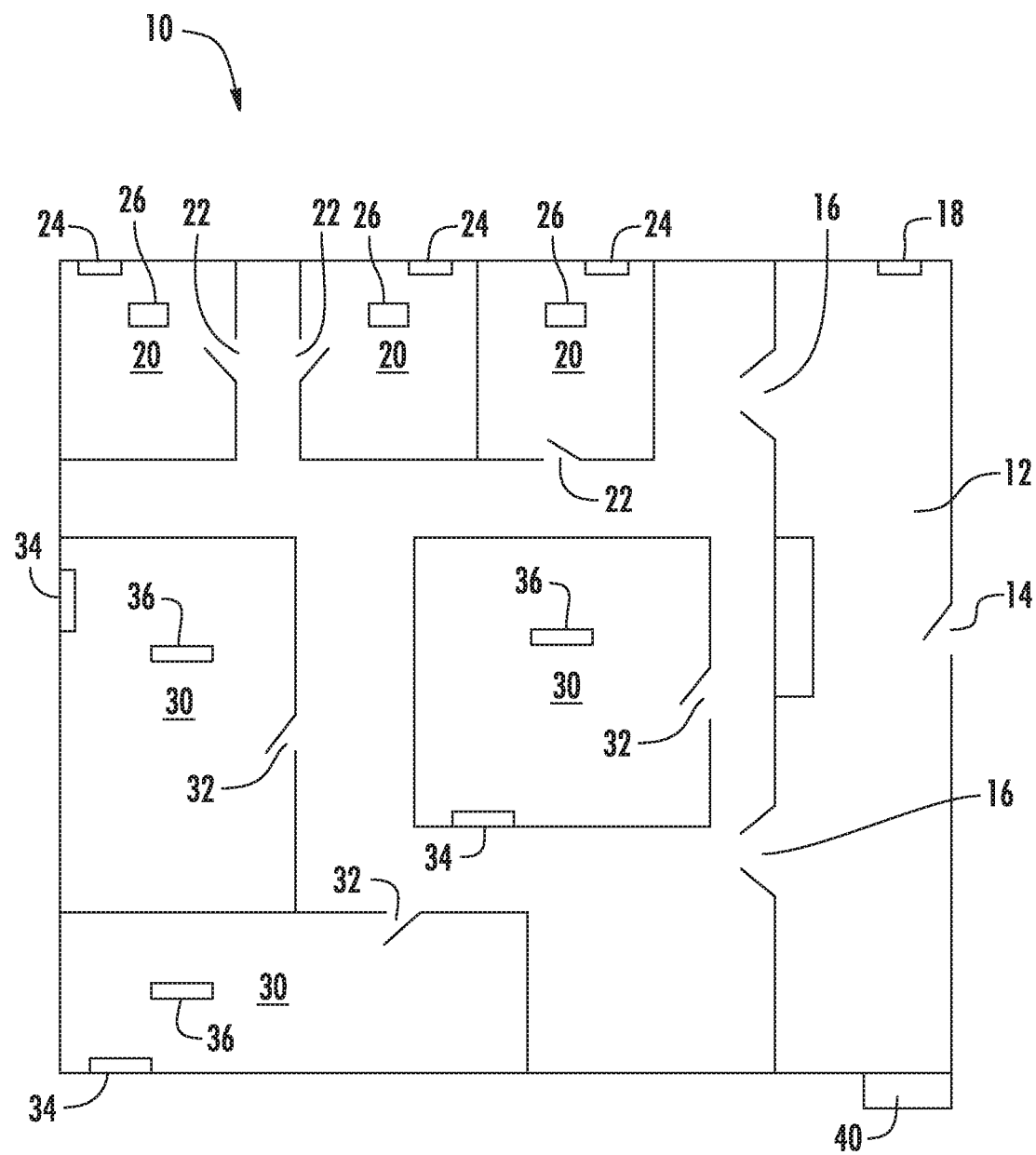
FIG. 1 illustrates an exemplary building including multiple smart building systems.

FIG. 1 schematically illustrates an exemplary floorplan of a sample floor 10 for a building including multiple smart building systems. The floor 10 includes a reception area 12 having an entryway 14 connecting to an outside of the building and two entryways 16 connecting to a remainder of the floor 10. Three offices 20 are included, each with their own corresponding entryway 22. Additionally included are three conference rooms 30, each with a corresponding entryway 32. Each of the offices 20, conference rooms 30, and reception area 12 includes a corresponding dedicated smart heating, ventilation and cooling (HVAC) system 18, 24, 34. Each of the offices 20 and conference rooms 30 include smart lighting systems 26, 36. While the exemplary floor 10 includes three smart building systems (lighting, HVAC, and entryways) it is appreciated that a practical building could expand this to any number of additional smart systems and the three illustrated smart systems are purely exemplary in nature.

Figure 13:
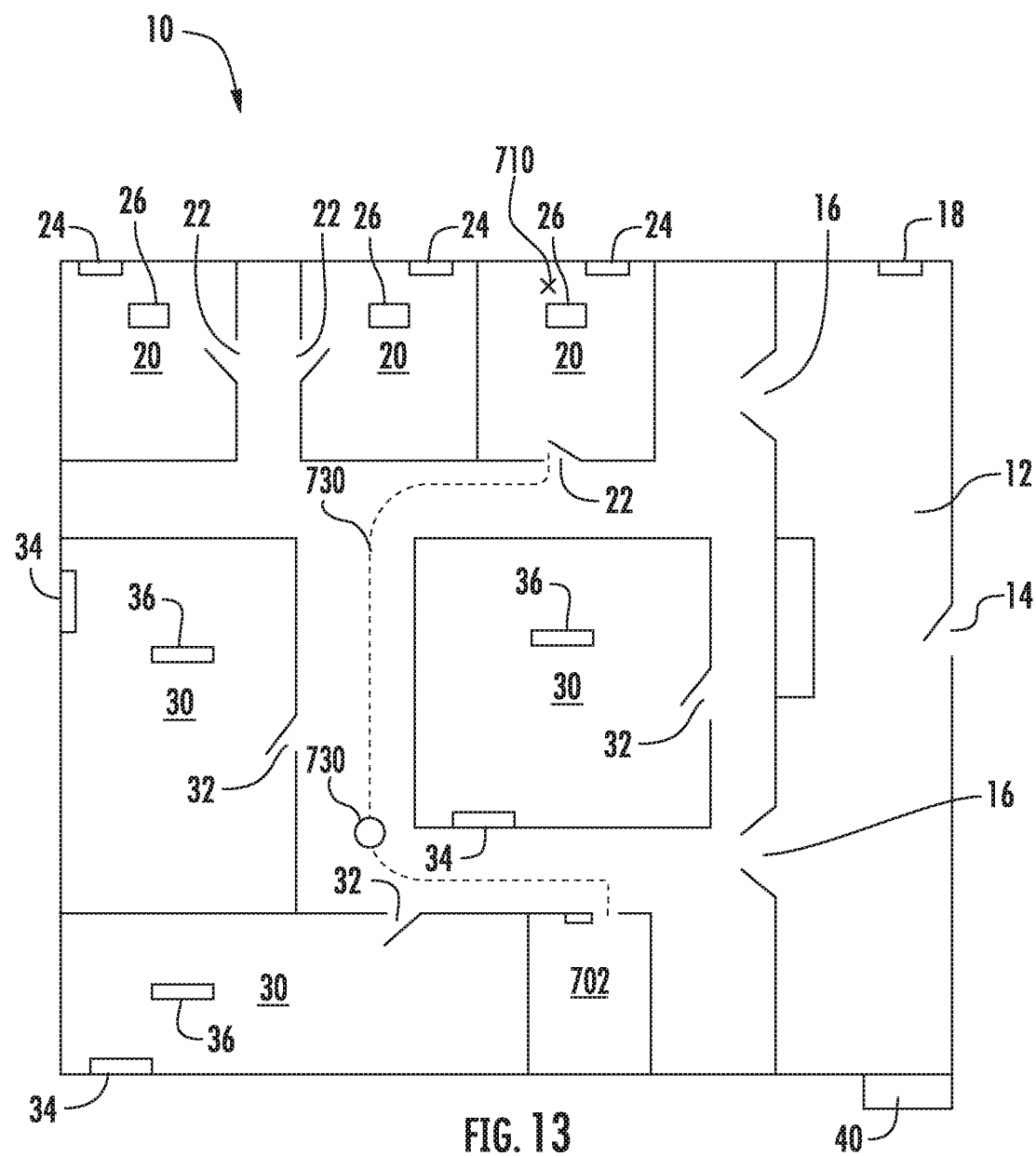
FIG. 13 schematically illustrates a map presented in the map pane after an elevator has been requested.

Also connected to the floor 10 is a building systems server 40. The server 40 is configured to connect with each smart building system within the floor 10, and to connect with a control application installed on one or more mobile device. In alternative configurations the server functions 40 can be achieved via the network of building systems without the inclusion of the server 40. In yet another alternative, the server 40 can be multiple interconnected servers. The connections can be direct physical connections, such as wiring within the walls, data connections through a wireless network, data connections through the internet, or any combination of similar connections. While illustrated as a single building systems server 40 controlling a single floor 10, it is appreciated that multiple servers 40 can operate in conjunction and/or multiple floors 10 can be controlled via the described system. By way of example, FIG. 13 illustrates the implementation of FIG. 1 as a single floor of a multi-floor building, including an additional elevator bank 702.

In existing buildings, each of the smart building systems includes its own control scheme and/or mobile control application. As described above, this can result in confusion or difficulty in operation of the building control systems due to different control schemes, overly complex levels of control, and the utilization of multiple different control applications. To alleviate this difficulty, the smart building systems of FIG. 1 interconnect with the building server 40 via the application programming interface (API) of each smart building system. The building server 40 can then connect with a custom control application installed on one or more corresponding mobile devices. The custom control application allows an authorized user in possession of the mobile device to control relevant building systems in a simple and intuitive manner.

Figure 2:
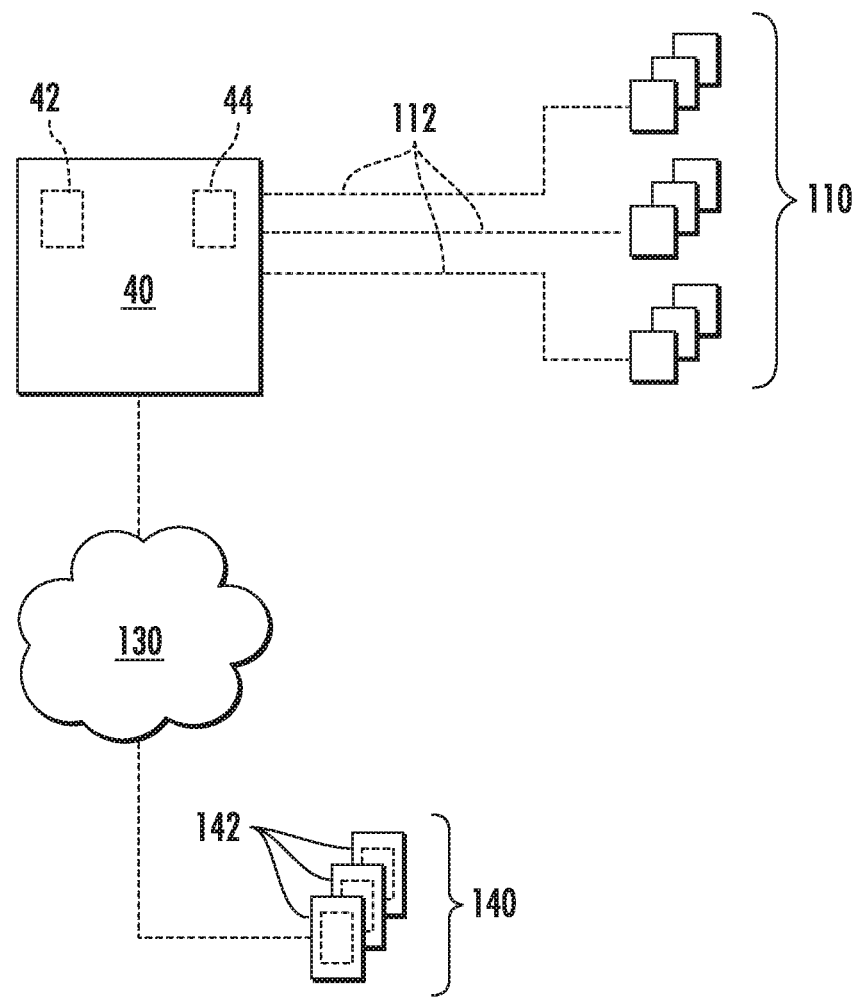
FIG. 2 schematically illustrates a control system for providing user control of the smart building systems.

With continued reference to the FIG. 1, FIG. 2 schematically illustrates an exemplary data connection allowing operation of the custom control application. The building server 40 is connected to each of the smart building systems 110 via a corresponding data connection 112. The building server 40 utilizes the built in API of each smart building system to provide control commands readable by the corresponding smart building system over the data connection 112. The data connections 112 can be wireless, wired, or a combination and can be achieved using any conventional data communication protocol. Also connected to the building system 40, via the internet 130, are multiple mobile devices 140. Each of the mobile devices 142 includes the custom control application 142 installed on the device.

The custom control application 142 utilizes a graphical user interface (GUI) (illustrated in FIGS. 3-12) to present the user with simple control operations. When a control operation is received by the mobile device 140 through the GUI, the mobile device 140 provides the control operation to the building server 40 through the internet 130. In alternative systems, where more security or control is required, the connection between the mobile devices 140 and the building server 40 can be restricted to connections over a local wireless communication protocol, can require an authorized login before operation, or both.

Once received at the building server 40, the control commands are converted by the building server 40 into a corresponding API instruction, or set of API instructions for the relevant building systems 110, and the API instruction is provided to the relevant building systems 110 over the data connections 112.

In some examples, the building server 40 can include an authorization system 42. The authorization system 42 can receive a username and password, or other login credentials such as a biometric authorization, and determine an appropriate access level for the user. Once the appropriate access level has been determined, the access level is provided to the corresponding mobile device 140. By way of example, if a user has access to one office 20, and one conference room 30, then the user's mobile device 140 will be limited to controlling the building systems within the office 20 and conference room 30, as well as the entryways limiting access to the office 20 and conference room 30. In another example, if the user's access is limited to floors 1, 3 and 4, the user is limited to controlling the building systems on floors 1, 3 and 4.

In yet further examples, the building server 40 can include a user location detection system 44. The user location detection system 44 can detect a position of a given user within the floor 10 based on context such as nearby smart building systems, which wireless data point the user is connected to, global positions systems, or any similar attribute. In examples where the building includes multiple floors, the user location detection system 44 can use the same systems to detect which floor 10 the user is on, as well as where the user is on that floor 10. The user location detection system 44 can then provide the location of the user to the corresponding mobile device 140, and enable additional control functions within the custom control application 142.

Figure 3:
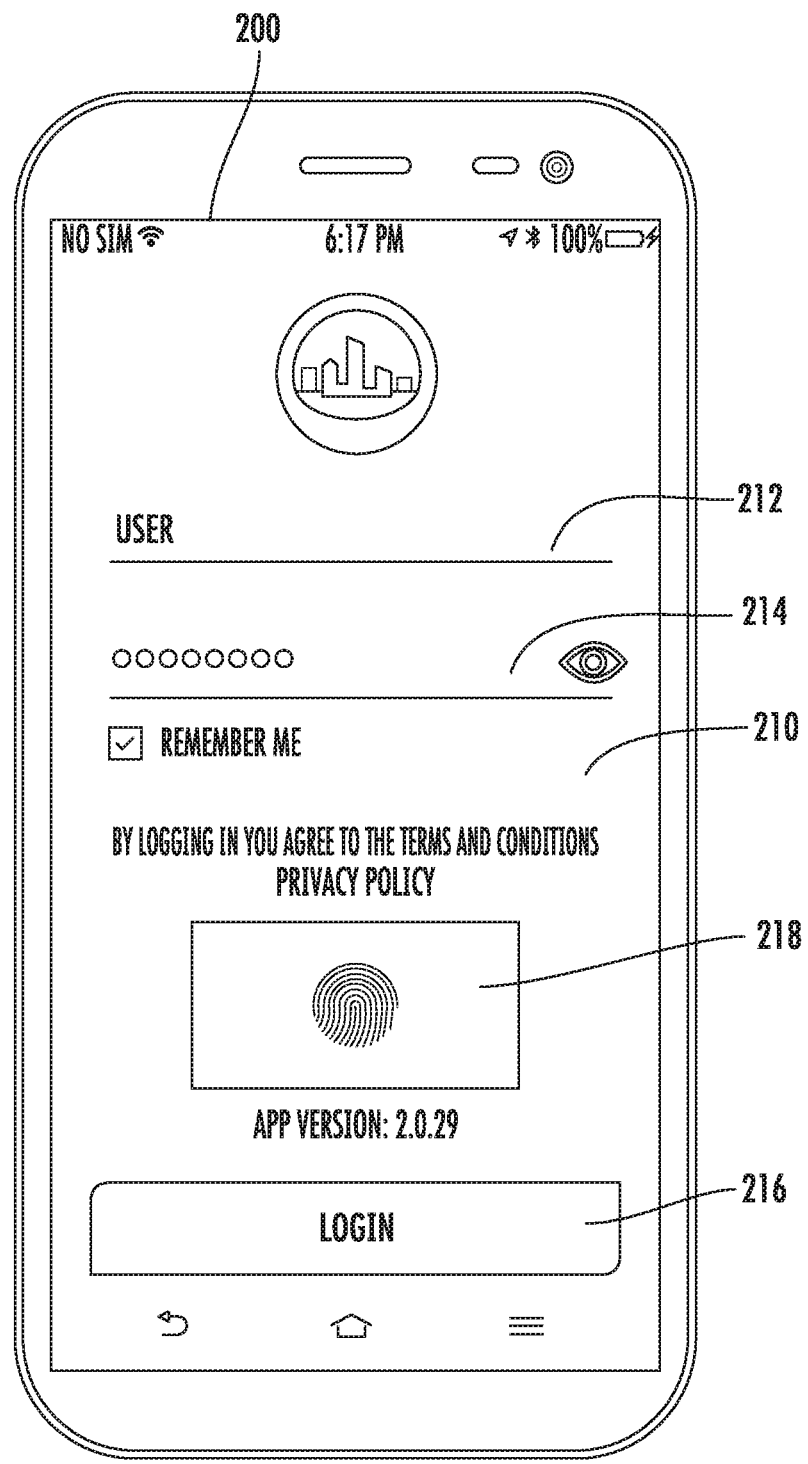
FIG. 3 schematically illustrates an exemplary user login screen of a mobile application for controlling the smart building systems.

With continued reference to FIGS. 1 and 2, FIG. 3 schematically illustrates a login screen 210 of a graphical user interface 200 of the custom control application 142 according to a first example. The login screen 210 includes a username field 212 and a password field 214, each of which allows the user to enter the corresponding information. Once entered, the user can submit the username and password via a login button 216. In examples including a biometric login, the login screen 210 also includes a biometric authorization pane 218. When the user interacts with the biometric authorization pane 218, any biometric authorization technique supported by the mobile device can be performed and the biometric authorization can be provided to the building server 40. In the example of FIG. 3, the biometric authorization is a fingerprint authorization.

Figure 4:
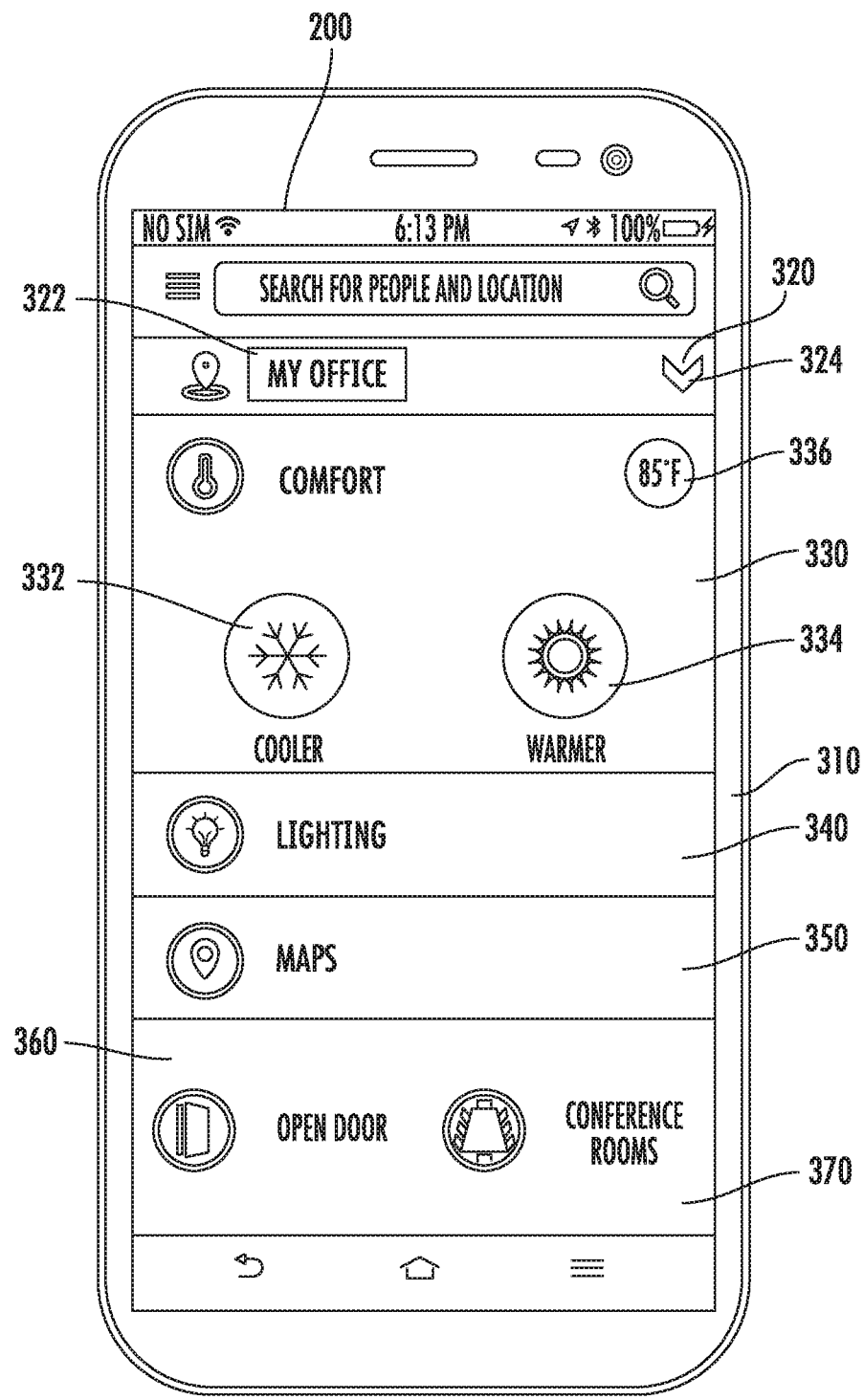
FIG. 4 schematically illustrates a view of a main screen of the mobile application.
Figure 5:
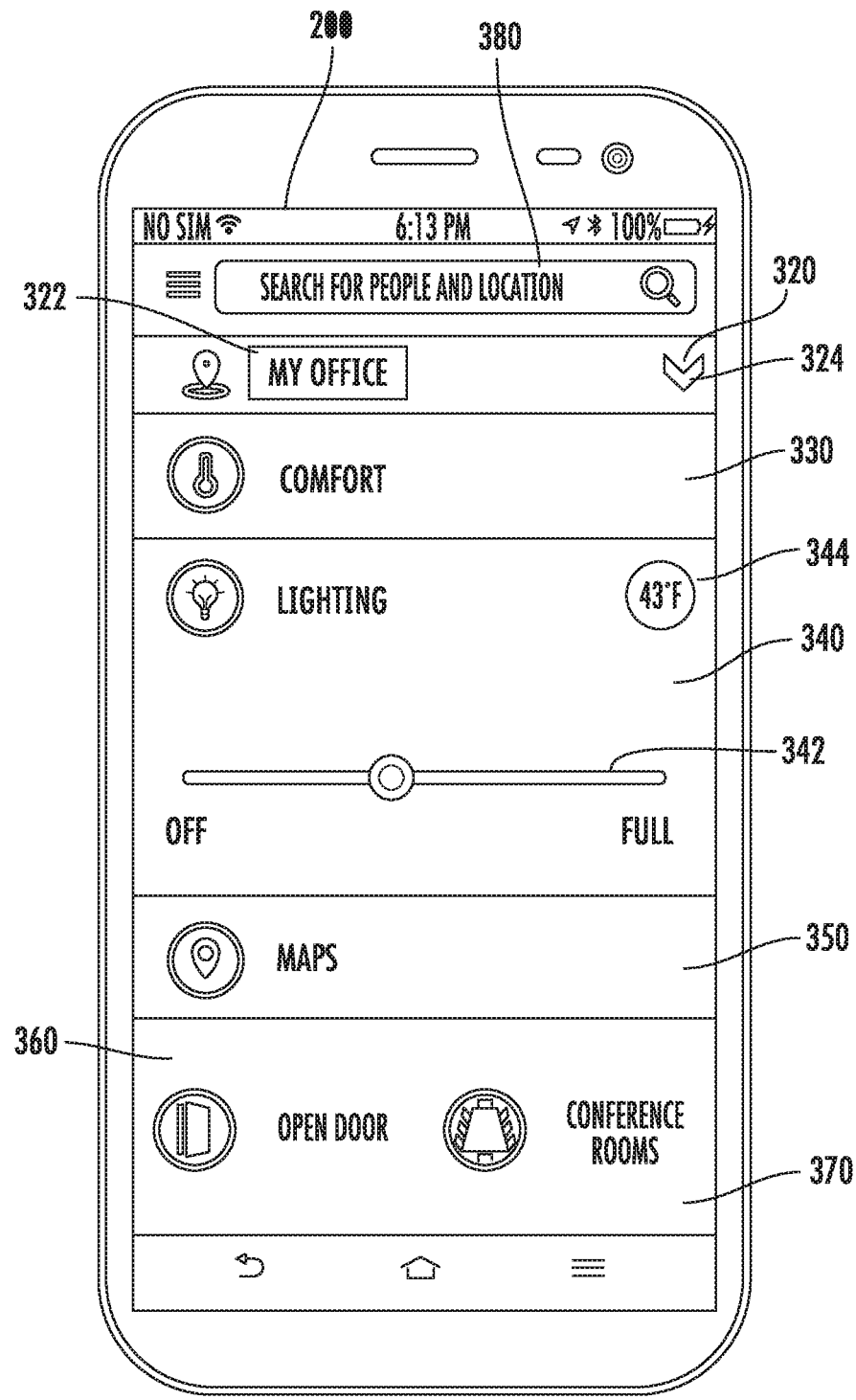
FIG. 5 illustrates another view of the main screen of the mobile application.

Once the authorization is submitted, and a corresponding authorization level has been determined by the authorization system 42 and transmitted back to the mobile device 140, the GUI 200 transitions to a home screen 310. With continued reference to FIG. 3, FIGS. 4 and 5 illustrate an exemplary home screen 310 in a first state (FIG. 4) and a second state (FIG. 5).

The home screen 310 includes a location pane 320. The location pane 320 displays the current location of the mobile device 140 operating the custom control application 142 via a text display 322. In some example applications, the location pane 320 can further include a drop down menu 324. The drop down menu 324 allows the user to manually override the detected location displayed in the text display 322 when the detected location is incorrect. By way of example, where two locations are in close proximity (such as adjoining offices 20), the user can activate the drop down menu and select the correct location. Once selected, the override lasts until the mobile device 140 detects that the user has moved to a new location within the floor 10 at which time the mobile device 140 will update the displayed location with the newest detected location.

In some examples, the user of a given mobile device 140 can set a preference for a specific location within the mobile device 140. The preference is used as a tie breaker by the custom control application 142 when two potential locations within the building are simultaneously detected with approximately the same likelihood. In such an example, the custom control application 142 will inform the building server 40 of the preference and the location will be determined to be the preferred location. In alternative examples, the preference can be stored within the building server 40 and associated with the user's authorization.

Also included within the home screen 310 is a comfort pane 330. When the user selects the comfort pane 330, the pane 330 is expanded (as shown in FIG. 4), and when a different pane is selected, the comfort pane 330 is contracted (as shown in FIG. 5). While expanded, the comfort pane 330 provides the user with a cooler button 332 and a warmer button 334. In the illustrated example, an actual temperature of the detected location can be displayed in a temperature display 336 within the comfort pane 330. In alternative examples the control can be further simplified by omitting the temperature display 336 entirely.

When the user interacts with the cooler button 332, the custom control application 142 provides an instruction to the building server 40 that the user wishes their current location to be cooler. The building server 40 then converts the cooler instruction into appropriate control signals for the HVAC system 18, 24, 34 of the current location and reduces the temperature. Conversely, when the user interacts with the warmer button 334, the same process occurs with an increase in temperature instead of a decrease.

By utilizing only the cooler button 332 and the warmer button 334, in conjunction with the detected location, the environmental controls of a given room are greatly simplified.

In some examples, such as those where multiple distinct users are in the same room (e.g. a conference room 30), the building server 40 can utilize a vote tallying system where a receipt of multiple different votes between cooler and warmer are received. In such an event, the building server 40 can take action according to the most votes selected. In alternative examples, the building server 40 can register the amount of distinct votes for cooler and warmer, and provide the information to building technicians. Provisions of the vote tally to the building technicians allows the technicians to adjust the HVAC systems for future operations, and the building server 40 will maintain the HVAC system 28, 24, 34 in its current state.

The example home screen 310 of FIG. 5 illustrates the comfort pane 330 contracted, and a lighting pane 340 expanded. The lighting pane 340 includes a slider bar 342 that the user can slide from a 0% (off) position to a 100% (full brightness) position. In the illustrated example, the lighting pane includes a current brightness display 344 which displays the numerical percentage of the brightness in the current location. In alternative examples, the brightness display 344 can be omitted. When the user adjusts the slider to be brighter or dimmer, a corresponding instruction is sent from the custom control application 142 to the building server 40. The building server 40 then converts the dimmer instruction to control signals for the lighting systems 26, 36 of the corresponding office 20 or conference room 30.

By correlating the brighter/dimmer instruction with the users current location, the building server 40 can adjust the brightness of only the lighting systems 26, 36 of the current room without requiring the user to navigate through a complex lighting control system and identify the specific lights they wish to dim or brighten.

The home screen 310 also includes maps pane 350. Interaction with the maps pane 350 causes each other pane to collapse, and opens a map of the current location, as identified in the location pane 320. The map can, in some examples be expandable, allowing a user to identify the relative position within the building of the current location, and identify relevant points of interest such as restrooms, faucets, emergency exits, and the like that may be in close proximity to the current location. In one example, a map 700 of the floor 10 on which the user is currently located is opened up within the maps pan 350. FIG. 13 illustrates one such example, including interaction with an elevator pane 680 discussed with regards to FIGS. 7-12.

In yet other examples, the maps pane 350 can allow the user to search for a specific location, or allow the user to identify a location in which the user is scheduled to attend a meeting. Once the location is identified, the custom control application can generate a map indicating the route the user should take in order to find the identified location.

Figure 6:
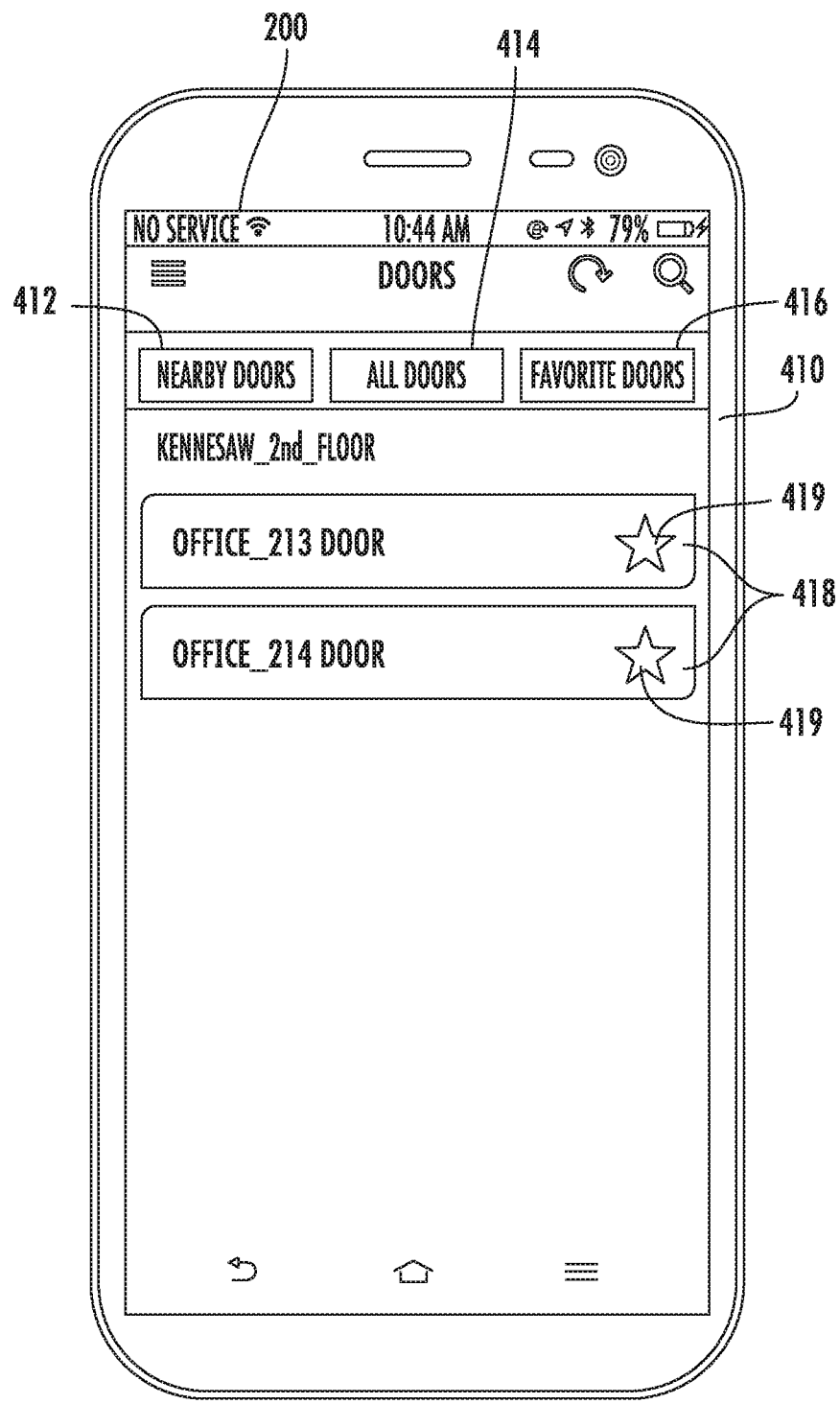
FIG. 6 schematically illustrates a maps screen of the mobile application.

Also included on the home screen 310 is an open door button 360. When selected, the open door button 360 switches the custom control application 142 from the home screen 310 to a door selection screen 410. The door selection screen 410 is illustrated in FIG. 6. The exemplary door selection screen 410 includes three options, nearby doors 412, all doors 414, and favorite doors 416. Selection of any of the three options 412, 414, 416 presents a list of entry ways 416, 22, 32 that fall within the selected option 412, 414, 416.

Each of the listed entry ways is presented via a labeled button 418. When the user clicks on the labeled button 418 corresponding to the door that the user wishes to pass through, the custom control application 142 submits a request to the building server 40. If the user is authorized to access that room, the building server 40 interacts with the building access systems and instructs the door in the corresponding entryway 26, 22, 32 to unlock and/or open. In addition, each of the buttons includes a favorite icon 419 that the user can interact with in order to designate a door as a favorite door or de-designate a door as a favorite door. When designated as a favorite, the door identifier is stored at the mobile device 140 or at the server 40 as a favorite, and can be used in tie breaker scenarios when one or more door is equally close.

Referring again to the home screen 310, illustrated in FIGS. 4 and 5, a conference room button 370 is also included on the home screen 310. As with the open door button 360, selection of the conference room button 370 brings the user to an available conference rooms screen. From the available conference room screen the user can select an unused conference room and reserve it for a conference. The room selected can be based on proximity to the user, size, or any number of other factors.

In addition to the previously listed panes 320, 330, 340, 350 and buttons 360, 370, the home screen 310 includes a search field 380. The search field 380 allows the user to search for rooms, points of interest (e.g. specific building locations), point of interest types (e.g. restrooms), elevator banks, or other users. Optionally, the results of any search can be sorted by distance from the mobile device running the application. When the user enters a room name or number into the search field 380, the maps pane 350 will expand, and a map providing directions to, and details of, the searched for room will be loaded. In the event that the search string results in more than one room, a selection menu is presented to the user prior to opening the maps pane 350. In the event that the search results in a location on a different floor from the user's current floor, an elevator call function in the elevator pane 680 (illustrated in FIGS. 7-12) can be automatically engaged.

When another user's name is entered into the search field 380, the custom control application 142 communicates with the building server 40 and determines if the user operating the custom control application is authorized to locate the searched for user. If the operator is authorized, then the building server 40 identifies a location within the building of the searched for user and displays that location to the operator of the custom control application 142. In the event that the user is not in the building, a message informing the operator that the user is not in the building can be presented instead.

In some examples, the location of the searched for user can be identified in conjunction with additional information known to the building server 40, such as how long the searched for user has been in their present location, how to get to the present location of the searched for user and the like.

In yet further examples, searching for a user can provide the operator of the custom control application with a prompt to alert the searched for user. Selecting the prompt will provide an alert to the mobile device of the searched for user, indicating that the operator of the custom control application 142 has requested their attention.

While illustrated in FIGS. 3-6 as a particular layout, one of skill in the art will appreciate that the graphical user interface of the custom control application can include additional panes corresponding to additional smart building systems that may be installed in the building, as well as a different relative position of the graphical elements, without impacting the functionality described herein.

Figure 8:
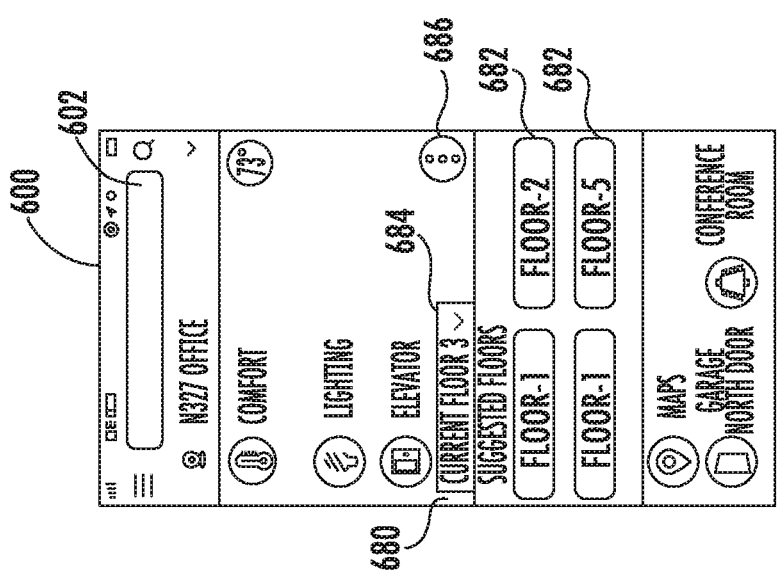
FIG. 8 schematically illustrates the main screen of FIG. 7 with the elevator call pane expanded.
Figure 7:
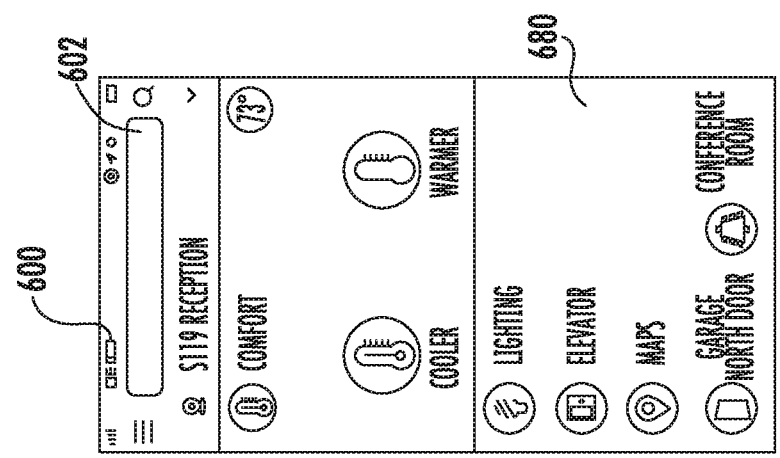
FIG. 7 schematically illustrates main screen of the mobile application including an elevator call pane.
Figure 12:
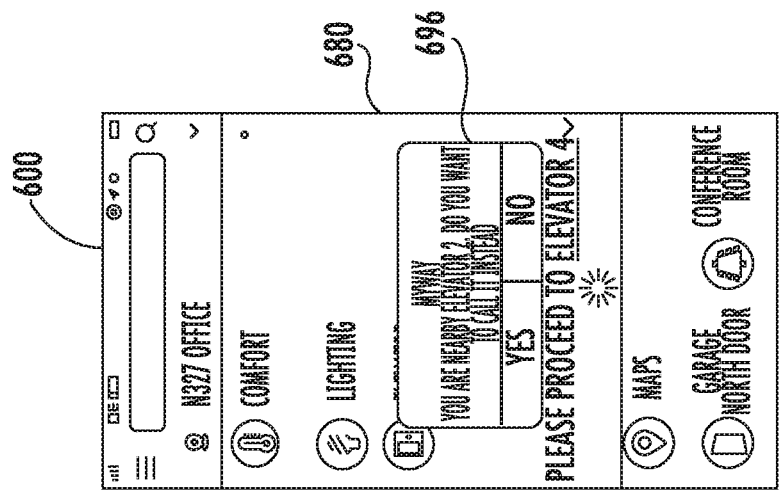
FIG. 12 schematically illustrates the main screen when a user has begun moving toward an incorrect elevator bank.

FIGS. 7-12 illustrates one exemplary system including an additional elevator pane 680. With reference to all preceding Figures, FIG. 7 illustrates a main screen 600 including all the features of the main screen 200 illustrated in FIGS. 4 and 5 with the addition of the elevator pane 680. When a user selects the elevator pane 680, the pane 680 expands as shown in FIG. 8. Included within the expanded elevator pane 680 are multiple buttons 682 indicating floors available to the user, and a text box 684 indicating which floor the user is currently on.

In some examples, such as the illustrated example, the text box 684 can include a drop down icon that allows the user to manually reset or change what floor they are on. This can be used to override an erroneous floor detection by the user location detection system 44 described above. Alternatively, the text box 684 can be a static display of the current floor as detected by the user location detection system 44.

In the illustrated example, each other possible floor is provided with a corresponding button. In alternative examples, such as a high rise building having a significantly large number of floors, the floor buttons displayed can be based on a set of known user favorites or frequently visited floors of the user. By way of example, a user can set floors 2, 6 and 38 as "favorite floors" in their user profile which will allow the system to always suggest those floors. By way of alternate example, the system can track which floors the user frequently visits and can know that the user frequents floors 2, 6 and 38 without the user manually entering the information.

In yet another example, the elevator pane 680 can display only buttons 682 of floors that the user is authorized to access, and the buttons 682 operate as an access control measure. In yet another example, the elevator pane 680 can display all floors and provide floors to which the user is not granted access with a distinct visual appearance indicative of the lack of access.

In the event that there are more floors than can reasonably be displayed, the buttons 682 display the suggested floors, as described above, and a drop down menu 684 can be utilized to open a window, or pane, showing all the floors available to the user. Alternatively, the user can utilize a text search function 602 to search for the desired floor.

Figure 9:
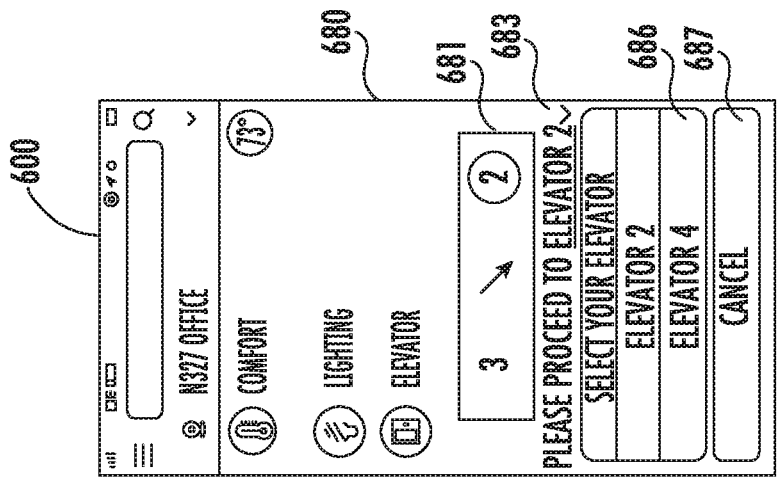
FIG. 9 schematically illustrates the main screen of FIG. 7 after an elevator has been requested.

Once the user selects the floor desired by using the buttons 682, the text search 602, or the menu 686, the elevator pane 680 transitions to a recommended elevator display illustrated in FIG. 9. Included in the recommended elevator display is an indicator 681 indicating which floor the user is currently on (3), which floor the user is traveling to (2) and which direction the elevator must travel to get to the desired floor (the downward arrow).

Also included in the recommended elevator display is a text instruction box 683 informing the user which elevator or elevator bank of multiple possible elevators or elevator banks the user should proceed to. The system determines which elevator or elevator bank to recommend based on the users position on their current floor, and the relative positions of each elevator in the elevator banks. In some examples, an additional display 685 can be included and allow the user to switch which elevator or elevator bank to head to by presenting each possible elevator or elevator bank as a corresponding button. Finally the user is able to cancel the elevator request via a cancel button 687.

Figure 10:
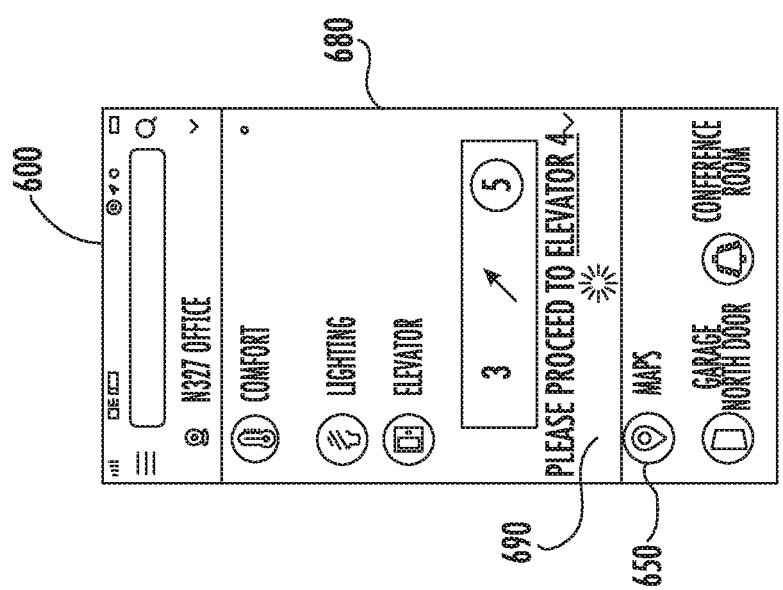
FIG. 10 schematically illustrates the main screen of FIG. 7 once an elevator has been determined.

Once an elevator has been selected by the user, and the user has begun moving to the selected or recommended elevator, the system detects that the user has begun moving to the selected or recommended elevator using the user location direction system 44 and displays a transition screen 690 within the pane 680 as illustrated in FIG. 10.

In some examples, the system can automatically transition to the maps pane 650 or the user can manually select the maps pane 650. In either example, a map 700 is launched as shown in FIG. 13. The map 700 includes directions 720 directing the user from their current location 710 along a determined path 720 to the selected elevator 702. When the user location detection system 44 detects that the user is within a predetermined distance of the elevator 720, such as when the user passes a proximity location 730, the system initiates the elevator call with the elevator control systems and the elevator begins traveling to the current floor.

Figure 11:
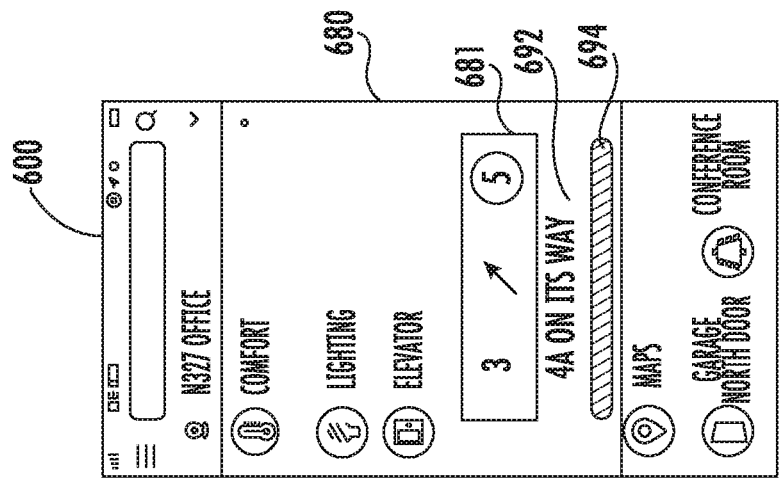
FIG. 11 schematically illustrates the main screen of FIG. 7 after an elevator has been dispatched.

Once the user has passed the proximity location 730, and the elevator has been called using the elevator control systems, the elevator pane 680 transitions to the display illustrated in FIG. 11, including the indicator 681 described previously, and a text indicator 692 indicating which specific elevator (elevator 4A in the illustrated example) in a given elevator bank has been sent by the elevator control system to the user's current floor. In addition, some examples include a progress bar 694 showing the progress of the elevator as it approaches the user's current floor.

In some examples, such as when the user does not consult the map, or does not read the application information after initiating the elevator call and when there are multiple elevator banks on a single floor, the user may head toward an elevator other than the suggested elevator. In such an example, the system can detect that the user is closer to, or headed towards, one of the non-called elevators and can display a prompt 696 (illustrated in FIG. 12) over top of the elevator pane 680. In some examples, the prompt 690 can ask the user to confirm that they wish to switch to the elevator that they are headed toward. In such an example, the prompt 680 includes buttons that allow the user to confirm that they wish to switch the called elevator to the elevator that they wished to call or to indicate that they wish to call the originally selected elevator.

In some examples, a user may initiate an elevator call using the elevator pane 680, as described above with regards to FIG. 7, but may decide not to move to the elevator bank, or use the elevator. In the event that the user does not utilize the cancel button 687 of FIG. 9, the system can include a predefined timeout timer and automatically cancel the elevator call after a predefined time period has elapsed. By way of example, if five minutes has elapsed since the user initiated the elevator call and the user has not begun heading toward the selected elevator, the system can determine that the user is not intending to utilize the elevator call and cancel the call.

With regards to all of the elevator call functions described above it is appreciated that in some examples the elevator call pane 680 can fully automate the elevator functions, while in other examples the user may still be required to manually select a floor and/or operate the elevator once the user has entered the elevator.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A building control system comprising:
   a plurality of interconnected building systems;
   a mobile application configured to be installed on at least one mobile device, and configured to cause the at least one mobile device to interface with the building server and to display a graphical user interface (GUI), wherein the GUI includes an elevator pane configured to allow a user to interface with a building elevator control system; and
   wherein at least one of the building server and the mobile application include a memory storing at least one preferred elevator, and wherein the mobile application defaults to selecting the preferred elevator in response to multiple entryways being on the same floor as the mobile device; and
   wherein the graphical user interface is configured to prompt the user to confirm a switch from a recommended elevator bank to a different elevator bank in response to the user moving toward the different elevator bank, and wherein the prompt includes buttons configured to allow the user to confirm that the user wishes to switch a called elevator to an elevator that the user wished to call.

2. The building control system of claim 1, wherein the building systems include a heating ventilation and cooling (HVAC) system, a lighting system, and an access/reservation system.

3. The building system of claim 1, wherein each of the building systems is interconnected via at least one building server.

4. The building control system of claim 1, wherein the GUI includes a location pane configured to display a location of the mobile device within a building, a comfort pane configured to display an increase option and a decrease option, a lighting pane configured to display a lighting option of the location of the mobile device and to display a lighting control option, and an access pane configured to display access information of at least one entryway of the building.

5. The building control system of claim 1, wherein the mobile application further includes a user credentialing system configured to interface with the building server, and determine an access level credential of a user of the mobile device.

6. The building system of claim 5, wherein the GUI includes a login screen, and wherein the user is required to gain access level credentials from the building server through the mobile device prior to the GUI displaying the elevator pane.

7. The building system of claim 6, wherein the user is required to provide biometric verification to gain access level credentials.

8. The building system of claim 1, wherein the elevator pane includes at least one desired floor button, with each desired floor button corresponding to a destination floor.

9. The building system of claim 8, wherein the elevator pane further includes a drop down menu configured to display a complete list of floors to which the user has access.

10. The building system of claim 9, wherein each floor that the user is not authorized to access is omitted from the complete list of floors.

11. The building system of claim 9, wherein each floor that the user is not authorized to access is included in the complete list of floors and is visually distinct from a remainder of floors.

12. A non-transitory computer readable medium storing a mobile application for controlling smart building systems comprising:
a graphical user interface including;
a location pane configured to display a location of the mobile device within a building;
an elevator pane configured to display a recommended elevator based on a user's location within the building, the user's desired floor, and a stored preferred elevator, wherein the displayed recommended elevator is the stored preferred elevator in response to multiple entryways being on the same floor as the mobile device;
an access pane configured to display access information of at least one entryway of the building; and
a single search option configured to receive one of a conference room name, a point of interest name, a point of interest type, floor number and a user name and cause the mobile application to perform a corresponding search, wherein the graphical user interface is configured to display a recommended elevator bank in response to receiving a floor number, and wherein the graphical user interface is configured to prompt the user to confirm a switch from the recommended elevator bank to a different elevator bank in response to the user moving toward the different elevator bank, and wherein the prompt includes buttons configured to allow the user to confirm that the user wishes to switch a called elevator to an elevator that the user wished to call.

13. The non-transitory computer readable medium of claim 12, wherein the elevator pane includes a display indicating a current floor of the user and a plurality of buttons indicating possible destination floors.

14. The non-transitory computer readable medium of claim 13, wherein the plurality of buttons is a set of preferred floors based at least in part on one of a user entered listing of preferred floors and the user's past locations within the building.

15. The non-transitory computer readable medium of claim 12, wherein the location of the mobile device within the building is a contextually determined location and the location is determined via at least one of data from the mobile device, data from a building server.

16. The non-transitory computer readable medium of claim 12, wherein the graphical user interface is configured to display a map directing the user to the recommended elevator bank.

* * * * *